United States Patent [19]
Rao

[11] Patent Number: 6,078,929
[45] Date of Patent: *Jun. 20, 2000

[54] INTERNET FILE SYSTEM

[75] Inventor: Chung-Hwa Herman Rao, Taichung, Taiwan

[73] Assignee: AT&T, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/870,609

[22] Filed: Jun. 6, 1997

[51] Int. Cl.$^7$ ..................................................... G06F 17/30
[52] U.S. Cl. ........................................... 707/200; 707/205
[58] Field of Search ........................... 395/188.1, 200.48, 395/200.59; 707/104, 9, 200, 205

[56] References Cited

U.S. PATENT DOCUMENTS

| | | | |
|---|---|---|---|
| 5,530,852 | 6/1996 | Meske Jr., et al. | 395/600 |
| 5,572,643 | 11/1996 | Judson | 395/793 |
| 5,572,709 | 11/1996 | Fowler et al. | 395/500 |
| 5,684,945 | 11/1997 | Chen et al. | 395/182.18 |
| 5,696,898 | 6/1995 | Baker et al. | 395/187.01 |
| 5,715,453 | 2/1998 | Stewart | 395/615 |

OTHER PUBLICATIONS

Glenn Fowler, David Korn, and Herman Rao; AT&T Bell Laboratories; DFS: Multiple Dimensional File System, pp. 136–154; Configuration Management, Edited by Tichy.

Herman C. Rao and Larry L. Peterson; Accessing Files in an Internet: The Jade File System, pp. 613–624; IEEE Transactions on Software Engineering, vol. 19, No. 6, Jun. 1993.

Vincent Gate; School of Computer Science Carnegie Mellon University, Pittsburgh, Pennsylvania 15213–3890; Alex–a Global Filesystem, pp. 1–11.

S.R. Kleiman; Vnodes: An Architecture for Multiple File System Types in Sun UNIX, pp. 238–247; Sun Microsystems sun!srk.

Dave Belanger, David Korn, and Herman Rao; Infrastructure for Wide–Area Software Development; AT&T Bell Laboratories, 600 Mountain Avenue, Murray Hill, NJ 07974, pp. 1–12.

John H. Howard, et al.; Scale and Performance in a Distributed File System; Carnegie Mellon University, ACM Transactions on Computer Systems, vol. 6, No. 1, Feb. 1988, pp. 51–81.

J. Postel, J. Reynolds. ISI, Oct. 1985; Network Working Group, Request for Comments: 959; File Transfer Protocol (FTP) pp. 1–61.

Mirjana Spasojevic, Transarc Corporation and M. Satyanarayanan, Carnegie Mellon University; An Empircal Study of Wide–Area Distributed File System; ACM Transactions on Compuuter Systems, vol. 14, No. 2, May 1996, pp. 200–222.

(List continued on next page.)

*Primary Examiner*—Paul R. Lintz
*Assistant Examiner*—Jean Bolteflelirantin

[57] ABSTRACT

A method and a system in which a computing system transparently accesses resources connected to the Internet. A memory of the computing system contains an operating system, a cache associated with the operating system, a shared library and an access server. The shared library is responsive to a system call for a file by determining whether a path name for the file is located under a personal name space in the memory and by issuing a request for retrieving the file from an Internet resource based on the path name located under the personal name space when the file is not stored in the cache and has a path name located under the personal name space An access server, in response to the request from the shared library, selects an appropriate access protocol for retrieving the file from the Internet resource and retrieves the file from the Internet resource. The shared library then issues the system call to the operating system when the access server retrieves the file. The access server restores the file to the Internet resource when the application closes the file.

13 Claims, 4 Drawing Sheets

OTHER PUBLICATIONS

T. Berners–Lee, CERN; L. Masinter, Xerox Corporation; M. McCahill, University of Minnesota Editors; Dec. 1994; Network Working Group Request for Comments: 1738, Category: Standards Track; Uniform Resource Locators (URL), pp. 1–22.

Glenn Fowler, David Korn, Stephen North, Herman Rao, and Kiem–Phong Vo; Libraries and File System Architecture, Chap. 2; pp. 25–90.

A.H. Skarra and H. Rao; A File System Interface for Concurrent Access; AT&T Bell Laboratories, Murray Hill, NJ 07974, pp. 1–4.

Herman Rao and Andrea Skarra; A transparent Service for Synchronized Replication Across Loosely–Connected File Systems; AT&T Laboratories, Murray Hill, NJ 07974, pp. 1–12.

Eliezer Levy and Abraham Silberschatz; Distributed File Systems: Concepts and Examples; Department of Computer Sciences, The University of Texas at Austin, Austin, Texas 78712, pp. 1–43.

Eduardo Krell, Balachander Krishnamurthy; COLA: Customized Overlaying; AT&T Laboratories pp. 1–5.

David K. Gifford, Pierre Jouvelot, Mark A. Sheldon, James W. O'Toole, Jr.; Semantic File Systems; Programming Systems Research Group MIT Laboratory for Computer Science, pp. 16–25.

David G. Korn and Eduardo Krell; A New Dimension for the Unix File System; AT&T Laboratories, Software–Practice and Experience, vol. 20(S1), S1/19–S1/34 (Jun. 1990), pp.S1/19–S1/34.

Edward R. Zayas, Craig F. Everhart; Design and Specification of the Cellular Andrew Environment; Draft, Aug. 2, 1988; Information Technology Center, Carnegie Mellon University, pp. 1–71.

The Sun Network File System; Sun Microsystems; Revision A of May 9,1988, pp. 311–346.

Addendum: Using the Automounter; Sun Microsystems; Revision A of 4 Apr. 1989, pp. 71–92.

Network File System: Version 2 Protocol Specification; Sun Microsystems; Revisino A, of May 9, 1988, pp. 167–185.

Rob Pike, Dave Presotto, Ken Thompson, Howard Trickey; Plan 9 from Bell Labs; AT&T Bell Laboratories; UKUUG Summer 90–London, Jul. 9–13 pp. 1–9.

Shared Libraries; Sun Microsystems; Revision A of 27 Mar. 1990, pp. 1–16.

INTERNET FILE SYSTEM

CROSS-REFERENCE TO RELATED APPLICATION

This application claims the benefit of provisional patent application Ser. No. 60/019,303 to C. H. Rao, filed Jun. 7, 1996, and entitled "Integrating The Internet Into A File System."

BACKGROUND OF THE INVENTION

1. Field of the Invention

The present invention relates to the field of computing. More particularly, the present invention relates to a method and a system for accessing resources that are available over the Internet.

2. Description of the Related Art

As more resources become available over the Internet, it is becoming increasingly difficult to locate, manage and integrate resources such as Web pages, Gopher information, Network News, released documents and technical reports, public domain software, and collaborative sources and drafts. Resources connected to the Internet are accessed using a naming scheme that is defined by the Uniform Resource Locator (URL) protocol, which has become a de facto standard. Internet resources are also accessed using other standard access protocols, such as the File Transfer Protocol (FTP) for file servers, the Hypertext Transport Protocol (HTTP) for web servers, the gopher protocol (GOPHER) for gopher servers, the Network News Transfer Protocol (NNTP) for news servers, and the Remote Shell (RSH) for file servers. Each of these particular access protocols define access mechanisms for retrieving resources from servers that are connected to the Internet. Internet browsers, such as Mosaic and Netscape, have been introduced for conveniently searching networks and retrieving information, but while perfectly adequate for searching and retrieving resources, such conventional browsers are limited and do not lend themselves for integration into larger toolsets.

Several systems have been developed for making access to files over the Internet easier and more efficient. For example, the Andrew File System provides a wide area file service by extending the scope of file systems from a Local Area Network (LAN) to the Internet. The Andrew File System, however, uses its own protocol, not the standard Internet protocols previously mentioned and, consequently, requires an Andrew file server.

Another system that has been developed for accessing files over the Internet is the Bell Laboratory Plan 9 which permits mounting of Internet file servers to local name spaces by introducing a new operating system. Plan 9 supports a per-process name space and a message-oriented file system protocol so that a file system-like interface is implemented. While different access protocols are accommodated, the Plan 9 operating system is not transparent to existing application tools and kernels, and the applications running on the kernels require modification for use with Plan 9.

The Alex File System provides transparent read access to Internet resources by being built on top of the existing Network File System (NFS), with an Alex server being added as a Virtual File System (VFS) interface. Hosts on a LAN use the NFS protocol for sending calls to the Alex server. The calls pass through an NFS client on a kernel that is local to the NFS server kernel on which the Alex server is running. The calls are then upcalled from the NFS server kernel to the Alex server. Nevertheless, the NFS protocol causes the Alex system to be limited because, while the NFS protocol implements file services, no information has been provided regarding a process initiating a request, which is important for implementing an authenticated access. Consequently, the Alex system only supports limited file-oriented file access, such as an anonymous FTP access.

The Jade File System provides a uniform way for naming and accessing files in an Internet environment using a new personal name server that integrates a heterogeneous collection of underlying existing file systems that may not be modified because of autonomy. A private name space can be defined by each user that supports two features: multiple file systems are allowed to be mounted under one directory, and one logical name space is permitted for mounting other logical name spaces. The Jade File System, however, does not use URL naming. Instead, a separate name server is provided for a pathname. Further, individual access servers must be mounted and the program running on the host must be recompiled before a user can access a file system.

The Multiple Dimensional File System (n-DFS) is a logical file system that allows new services to be added to underlying file systems without requiring applications or the operating system kernel to be modified. The n-DFS is layered on top of existing physical file systems, but does not provide convenient Internet access using existing protocols.

What is needed is an Internet file system that transparently uses existing protocols in connection with existing operating system kernels, applications and file servers for accessing Internet resources.

SUMMARY OF THE INVENTION

The present invention provides an Internet file system that transparently uses existing protocols in connection with existing operating system kernels, applications and file servers for accessing Internet resources. Consequently, an application programmer can use the same system calls to handle files, whether stored locally or at Internet resources. The advantages of the present invention are provided by a method and a system in which a computing system having a processor and a memory transparently accesses resources connected to the Internet. The memory of the computing system contains an operating system, a cache associated with the operating system, a shared library and an access server. The shared library is responsive to a system call for a file by determining whether a path name for the file is located under a personal name space in the memory and by issuing a request for retrieving the file from an Internet resource based on the path name located under the personal name space when the file is not stored in the cache and has a path name located under the personal name space In response to the request from the shared library, the access server selects an appropriate access protocol for retrieving the file from the Internet resource and retrieves the file from the Internet resource. The shared library then issues the system call to the operating system when the access server retrieves the file. The access server restores the file to the Internet resource when the application closes the file.

BRIEF DESCRIPTION OF THE DRAWING

The present invention is illustrated by way of example and not limitation in the accompanying figures in which like reference numerals indicate similar elements and in which.

DETAILED DESCRIPTION

The present invention relates to an Internet File System (IFS) that allows users to manage Internet files in a Personal Name Space (PNS) by transparently integrating existing protocols, while requiring no modification of software or change in management of remote servers. The present invention introduces a logical layer between an operating system and applications running on the operating system that presents the applications with exactly the same system call interface that the underlying operating system provides. The logical layer of the present invention runs in the same address space as the application without requiring operating system modifications.

According to the invention, each user selects Internet files for access by organizing the files within a PNS and thereby avoids the complexity of maintaining a system-wide global name space. According to the present invention, a PNS is private and remains undefined to all other users. Only the owner the PNS has access to the PNS. A PNS can be "mounted" or attached to a shared name space or to another name space that supports URL naming. Internet files can be accessed directly using the URL names of the files as pathnames. For example, a home page identified by http://www.att.com/research.html is named ~/IFS/http:/www.att.com/research.html, where ~/IFS is the mount point on a local file system for a PNS. Additionally, a PNS supports mount operations that attach name spaces of Internet file servers to nodes of the PNS using access protocols, such as File Transport Protocol (FTP). Thus, a PNS allows a file system to name and access files, and to perform mounting operations that support location-independent naming.

Figure 1:
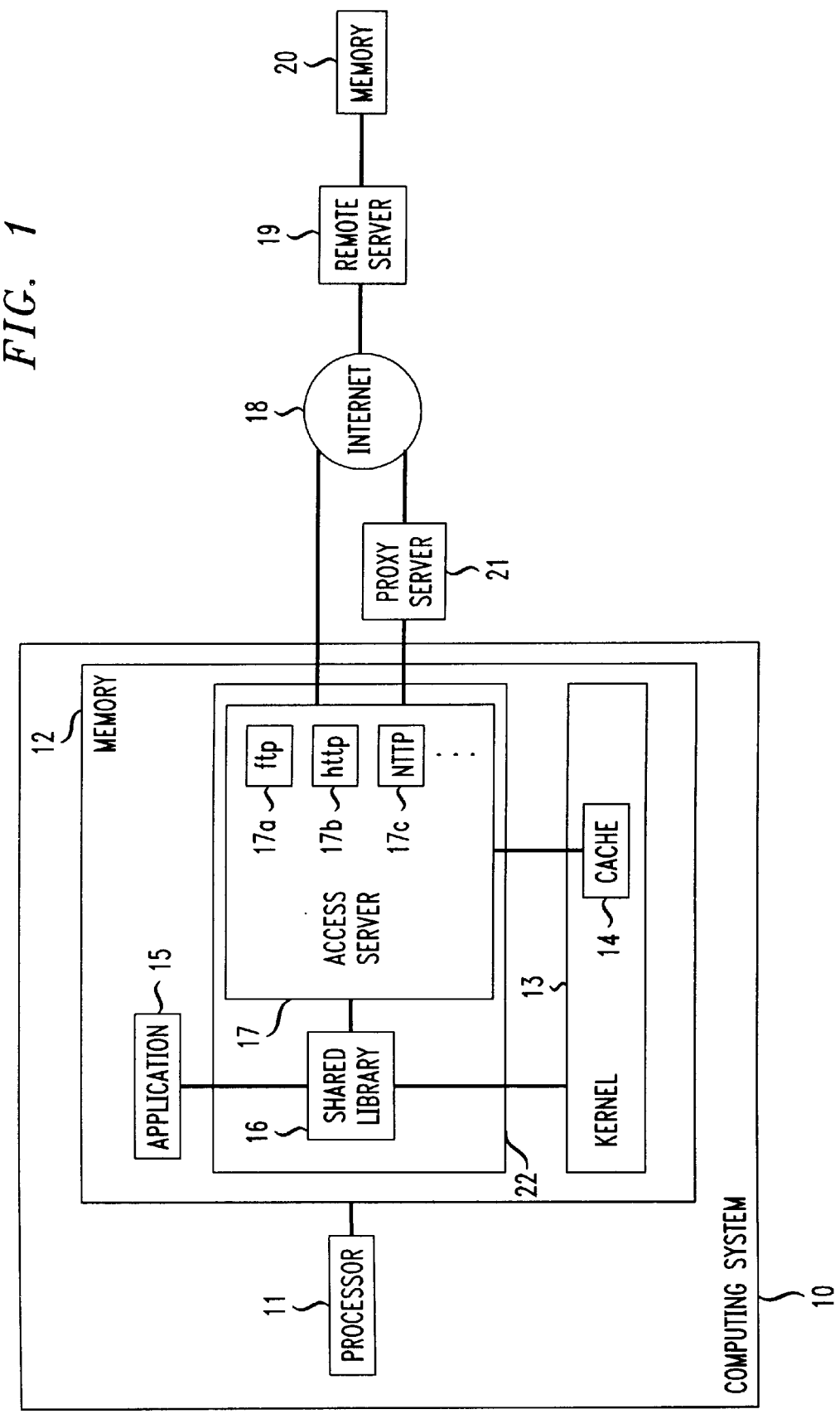
FIG. 1 is a block diagram of the architecture of a system according to the present invention.

FIG. 1 is a block diagram of the architecture of a system according to the present invention. System 10 includes a processor 11 coupled to a memory 12. Memory 12 includes memory space for storing an operating system kernel 13, a cache 14 for kernel 13, at least one application 15, such as a browser, a shared library 16 and an access server 17. Processor 11 and memory 12 can be physically located within a single device or can be configured as a plurality of processors and memory devices that are distributed using well-known LAN techniques. A plurality of applications can also be run by system 10 using well-known techniques.

When application 15 sends a request or system call to kernel 13 for opening, reading, writing, closing, etc., a file, for example, the request is received by a logical layer 22 that includes shared library 16 and access server 17. Preferably, shared library 16 presents applications with a complete POSIX system interface. Shared library 16 is linked by application 15 and runs in the address space of application 15. All of the necessary functionality for handling system calls is provided by shared library 16. According to the invention, shared library 16 includes a capability for handling a PNS, that is, shared library 16 is capable of determining whether the pathname for a file specified in a system call is located under a PNS for a user of the application. The determination is made by examining the mount point (the iroot). If the specified file is located under a PNS, shared library 16 determines whether the requested file is an Internet file or is stored locally. If the file is an Internet file, shared library 16 communicates the request from the application 15 to access server 17 through an interprocess communication (IPC) in a well-known manner. For computing systems that provide dynamic shared libraries, application 15 may invoke shared library 16 by simply redefining a library search path to include shared library 16. For computing systems without dynamic shared libraries, applications must be relinked with shared library 16.

Access server 17 selects the appropriate access protocol for the specified file, connects to remote server 19 via the Internet 18, and obtains the specified file which is stored in memory 20 from remote server 19. Access server 17 is capable of performing an authenticated access of an Internet server "on behalf of" a user who is running application 15. That is, access server 17 can access remote file servers using the user's password information. To do this, shared library 16 is capable of authenticating itself to access server 17 .

Once the specified file is obtained, access server 17 caches the file locally in cache 14. Access server 17 contains a plurality of agents, with each agent implementing a particular access protocol. FIG. 1 shows exemplary agents 17a, 17b and 17c. Agents may contact remote servers directly or through proxy servers, such as proxy server 21. Access server 17 performs three basic functions of mounting a remote file system on a local name space, retrieving a remote file and restoring a file to its primary server. The functions of retrieving and restoring are mapped to corresponding commands supported by specific protocols, while the function of mounting is a local operation.

Access server 17 maintains a mounting database for each PNS defined within system 10. Information required for accessing an Internet file, such as the access protocol, the host, authentication information, remote path information, etc., are stored in the database. Each entry for a PNS also includes the mount point for the PNS. Access server 17 refers to the mounting information in the mounting database for locating, retrieving and storing the file in cache 14 of the operating system kernel 13. Access server 17 sends an IPC message to shared library 16 when the specified file has been cached. Shared library 16 then retrieves the specified file from cache 14. When the file is closed by application 15, access server 17 restores the file back to remote server 19. When the specified file is a local file, that is, stored locally elsewhere within system 10, shared library 16 directly accesses the file.

Preferably, an Internet file is cached in its entirety on the local file system when it is opened because remote file servers are contacted only for system file "opens" and "closes" and not for individual reads and writes. In this manner, the total network overhead incurred by transmitting a file is lower when the entire file is retrieved rather than as a series of system requests and responses for individual pages. Since accesses to files over the Internet are expensive in terms of overall system resource consumption, when a cached copy of a file is accessed, the present invention determines whether the data of the cache are consistent with master copy data stored in the remote server.

Figure 2:
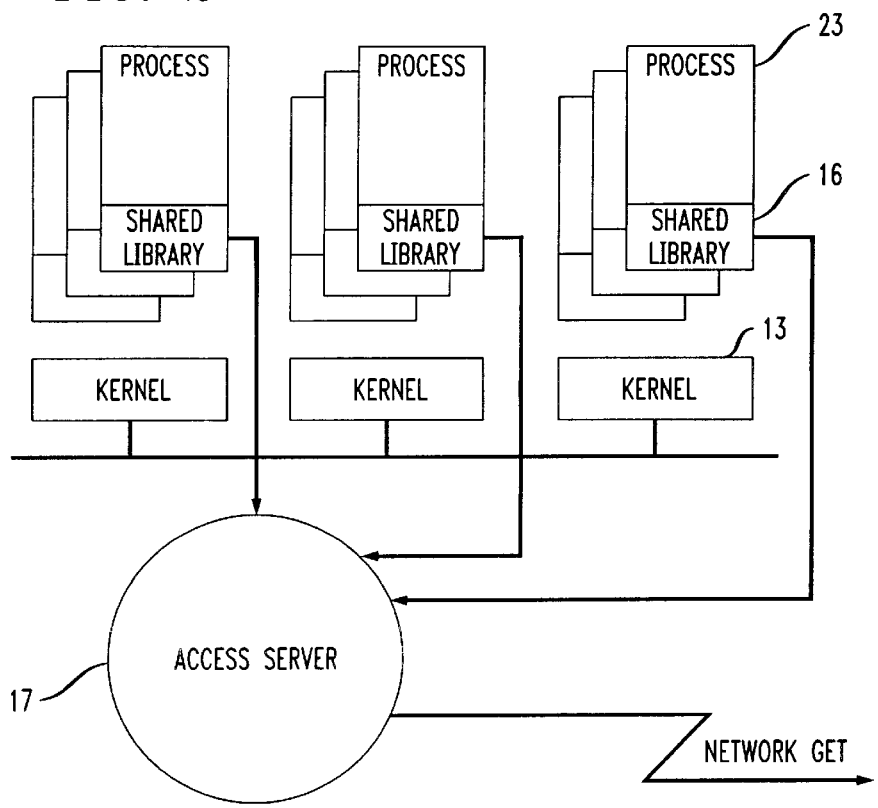
FIG. 2 is a block diagram of a system having an architecture that supports coherent sharing for different applications according to the present invention.

While a single access server 17 is shown in layer 22 in FIG. 1, a plurality of access servers can be used. For example, a basic configuration of the present invention can include an access server 17 for each system user and a system-wide name server for locating each user's access server. Alternatively, groups of users can share a particular access server 17. The present invention also allows file servers located on the Internet to be mounted as user-level implementations, as shown in FIG. 2, rather than as a kernel implementation as in conventional systems. In FIG. 2, each shared library 16 that is associated with a process 23 directly accesses access server 17, rather than the application being processed through an associated kernel, the NFS protocol (not shown) and an access server (not shown), as is presently done in the prior art.

Figure 3:
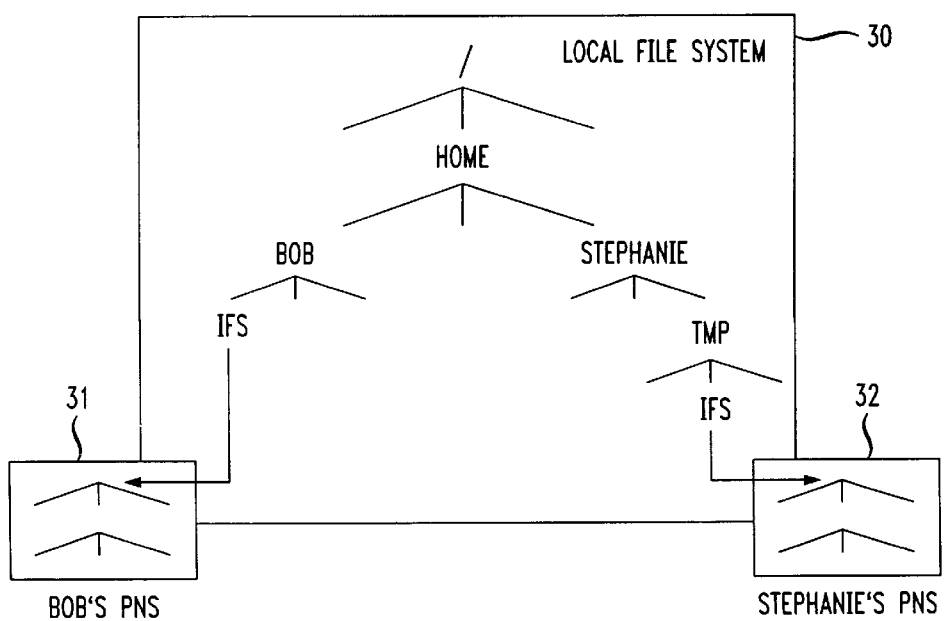
FIG. 3 illustrates the concept of a personal name space (PNS) according to the present invention.

FIG. 3 illustrates the concept of a PNS within a local file system 30. A first PNS 31 is shown mounted to local file system 30 at /home/bob/IFS and owned by the user Bob. A second PNS 32 is shown mounted at /home/stephanie/tmp/IFS and owned by the user Stephanie. A PNS is defined by the directory pair (Mountpoint, CacheDirectory), where MountPoint is a local pathname in the file system to which PNS is mounted or attached, and CacheDirectory is a local directory in which remote files and directories are cached. Essentially, MountPoint indicates where the mount is pointing. In FIG. 3, the mount point for PNS 31 is /home/bob/IFS and the mount point for PNS 32 is /home/stephanie/IFS. Cachedirectory is needed in a file system structure as a place to put a cache file. To simplify the task of maintaining multiple PNSs, the present invention uses a single directory called an IRoot for a MountPoint and a CacheDirectory. An IRoot is a mount point for a PNS and a physical directory on the local file system where remote files and directories are cached. That is, an IRoot includes the mount point and the cache directory. A user defines a PNS by specifying the IRoot using the command iroot:

$ iroot pathname

As shown in FIG. 3, the IRoot for PNS 31 is defined to be /home/bob/IFS, while the IRoot for PNS 32 is defined to be /home/stephanie/tmp/IFS. PNSs 31 and 32 are each mounted on local name space 30. Files and directories located under PNS 31 (/home/bob/IFS) are accessible only to the particular user defining PNS 31. To other users, such as the user who defined PNS 12, the files and directories under /home/bob/IFS are undefined.

The Universal Resource Locator (URL) naming scheme is embedded within the system of the present invention. The URL naming scheme has the form:

protocol://user:password@host:port/path where "protocol" is the access protocol, "user" is an optional user name, "password" is an optional password, "host" is the fully qualified domain name of a network host or its IP address, "port" is an optional port number to which to connect to, and "path" is the path used by the remote server for accessing the desired resource. The access protocol not only provides the key to accessing Internet resources located on remote servers, but also hides the heterogeneity of a system on which the accessed server is located. That is, once an access protocol becomes available, it is possible to access resources provided by a server using the protocol without regard to the machine type or the operating system of the server. Consequently, the present invention supports a heterogeneous collection of access protocols.

Table I shows exemplary pathnames and corresponding URL names with "~IFS" designating the IRoot that includes the mount point and cache directory.

TABLE I

| IFS Pathname | URL Name |
| --- | --- |
| ~/IFS/ftp:/ftp.ai.mit.edu/pub/README | FTP:/ftp.ai.mit.edu/pub/README |
| ~/IFS/rsh:/king/src | rsh://king/src |
| ~/IFS/http:/research.att.com/people/list.html | http://research.att.com/people/list.html |
| ~/IFS/nntp:/ulysses/comp.os.research/5364 | nntp://ulysses/comp.os.research/5364 |
| ~/IFS/gopher:/csie.nctu.edu.tw | gopher://csie.nctu.edu.tw |
| ~/IFS/ftp:/john:xxx@gryphon/home/john | ftp://john:xxx@gryphon/home/john |
| ~/IFS/http:/jade:8000/project/DAF.html | http://jade:8000/project/DAF.html |
| ~/IFS/http/192.127.159.32:8000/IFS.html | http://192.127.159.32:8000/IFS.html |

The following exemplary pseudocode opens a home page using the system call open(), reads a file located at a URL name using the system call read(), processes the contents of the file as raw data, and closes the file using the system call close():

```
fd = open("~/IFS/http:/research.att.com/books.html",0_RDONLY);
while ((num = read(fd, buf, nbyte)) > 0)
{
        /* process data in buf */
}
close(fd)
```

The present invention also provides that an Internet resource can be located, managed and interacted with using existing commands and tools. For example, the command line $ ls~/IFS/nntp:/ulysses/comp.os.research/* lists articles in the news group "comp.os.research" that are stored on the News server "ulysses." Additionally, the command line $ grep thread~/IFS/nntp:/ulysses/comp.os.research/* searches for the keyword "thread" in the News group "comp.os.research".

Mounting allows shortcuts to be created when naming files by providing indirect naming and also maintains authentication information for contacting remote servers. Additionally, mounting allows a proxy server to be specified through which the present invention accesses a desired file server. Both PNSs and mount points within a PNS are defined on a per-user basis. According to the invention, a mount operation allows a user to attach a name space, such as PNS, to another name space. The mount operation can attache a PNS on top of a global name space, and can attach a remote file system to a PNS.

A mount point is specified by the command mount:

$ mount URLName MountPoint [ProxyServer:Port] [ValidPeriod]

where "URLName" is the URL name of a file/directory accessible over the Internet, "MountPoint" is the defined mountpoint in a PNS (for example, IFS in FIG. 3), "ProxyServer" is an optional proxy server parameter, and "Port" is an optional parameter specifying the tcp port of the proxy server.

When the ProxyServer and Port parameters are specified, the present invention accesses the specified remote server through the specified proxy server. The parameter ValidPeriod (in seconds) specifies a time period during which cached files under the mount point are considered to be valid. Specifically, when a file is accessed, the cached file can be used when its age is still within the specified ValidPeriod. If ValidPeriod time has expired, the file must be obtained from the network. The URLName may contain a user name and a password, and when present, the present invention authenticates access to the remote server on behalf of the user using the password. If the value of password is "-", the mount command preferably requires the user to enter the password at the next prompt.

Figure 4:
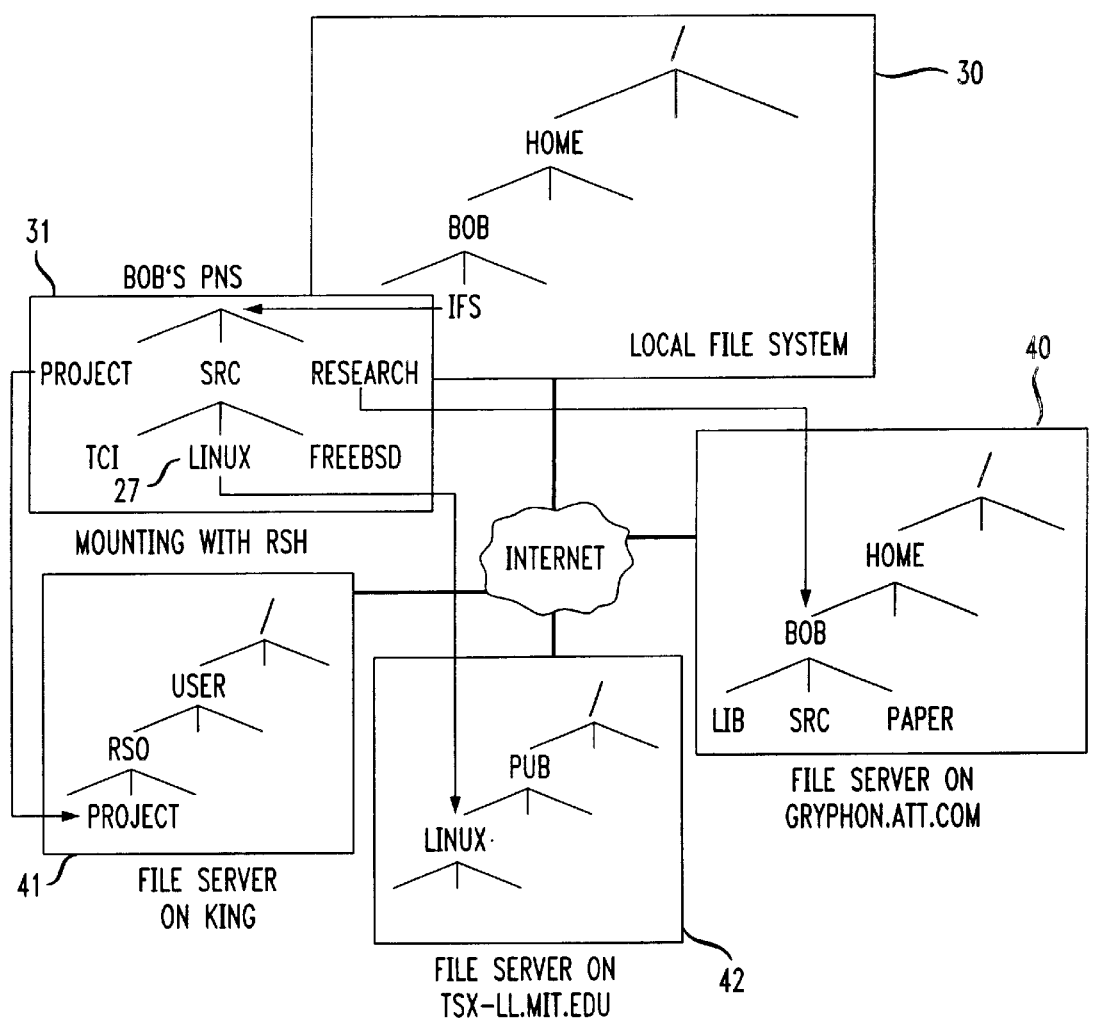
FIG. 4 shows a diagram illustrating the mounting of remote file systems according to the present invention.

FIG. 4 illustrates how remote file systems are mounted according to the present invention. In FIG. 4, remote file systems that use different protocols are mounted to the IRoot /home/bob/IFS (PNS 31 in FIG. 3). File server 40 at gryphon.att.com is mounted to /home/bob/IFS as follows:

$ mount ftp://bob:-@gryphon.att.com.home/bob /home/bob/IFS/research

Password: ******

This command mounts the directory bob, located in the file server 40 on gryphon.att.com, on PNS 31 at the node ~/home/bob/IFS/research using the ftp protocol. In this example, the command mount prompts Bob to enter a password because "-" has been specified in the password field. Whenever the user Bob access files under /home/bob/IFS/research, the present invention retrieves the corresponding files from gryphon.att.com on behalf of Bob, using Bob's entered log-in and password. Another example of the mount command is:

$ mount rsh://king/home/rao/project /home/bob/IFS/project

For this example, the directory project, located in the file server 41 at king, on PNS 31 at the node ~/home/bob/IFS/project via the rsh protocol, which provides authenticated accesses. Users specify user names and passwords inside URLName. The system takes authentication information from the .rhosts file in the user's home directory. This avoids passing password information through the network.

In the following example of the mounting command, a mount point is created using an anonymous ftp access:

$ mount ftp://tsx-11.mit.edu/pub/linux/home/bob/IFS/src/linux radish:8000 where the proxy server on radish on the port 8000 is used for accessing tsx-111.mit.edu. The remote directory linux in the file server 42 on tsx-11mit.edu for this example is mounted on the node linux in PNS 31.

The present invention provides two methods for controlling cache validation processes. First, an attribute ValidPeriod, assigned using mount commands, is associated with each directory. Each directory inherits VaildPeriod from its parent directory. A cached copy of a file under a created directory is treated as valid, without checking its primary copies, if the copy was retrieved during ValidPeriod. For example, if ValidPeriod for a cached file is set to be 7200 seconds, the cached copy is considered as valid for 7200 seconds. When ValidPeriod is "−1", the cached copy is always considered valid. When ValidPeriod is "0", the cached copy is always invalid. ValidPeriod can be changed dynamically like many other attributes associated with directories.

For the second validation control method, a per-process mask, referred to as ValidMask, is provided for overwriting the ValidPeriod of a directory. A child process inherits ValidMask from its parent process and a built-in shell command vmask is used for defining and updating the process ValidMask. The per-process ValidMask has higher priorities than the per-directory ValidPeriod. That is, when dealing with a particular type of file, the valid time is determined according to the mounting, i.e., the file desired to be accessed. When considering the purpose for using the file, the valid time is the time of the process according to the application, i.e., the time the application uses the file. Thus, with ValidPeriod, cache validation processes can be controlled according to types of Internet files, such as co-authored papers versus Network News, whereas, ValidMask allows overwriting ValidPeriod on the process level in special circumstances, such as refreshing cache 14.

Figure 5:
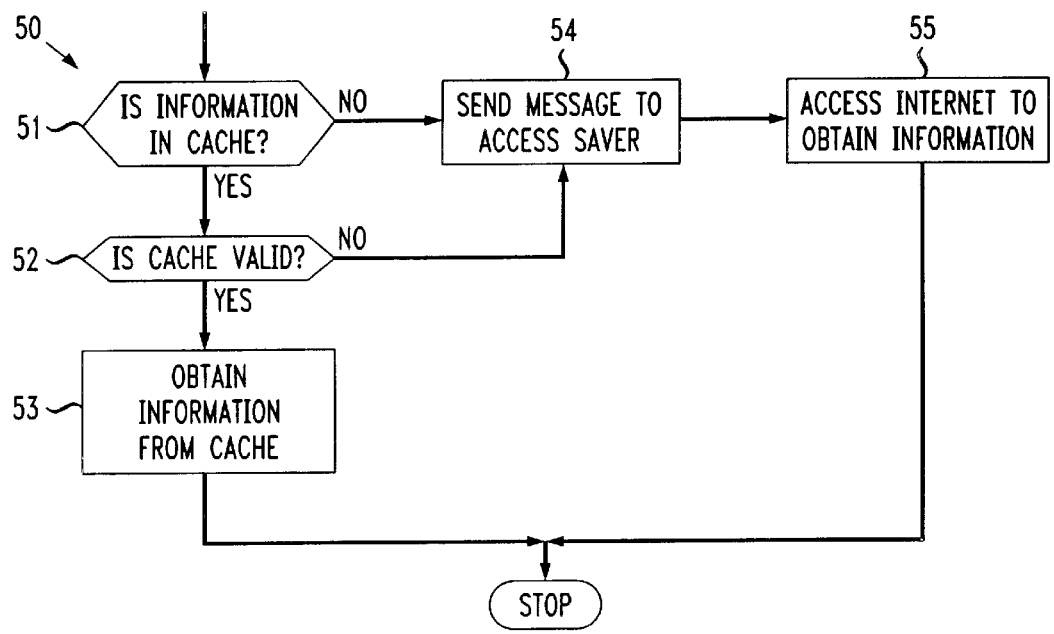
FIG. 5 shows a flow diagram of a validation process according to the present invention.

FIG. 5 shows a flow diagram for a validation process 50 according to the present invention. At step 51, it is determined whether the requested information is in the cache. If the requested information is in the cache, flow continues to step 52 where it is determined whether the cache is valid under ValidPeriod or ValidMask. If so, flow continues to step 53 where the information in the cache is retrieved for the system call. If the information is not in the cache (step 51) or the cache is not valid (step 52), flow continues to step 54 where a message is sent from the shared library to the access server. Flow continues to step 55, where the Internet is accessed, the information is retrieved and then is stored in the cache.

Figure 6:
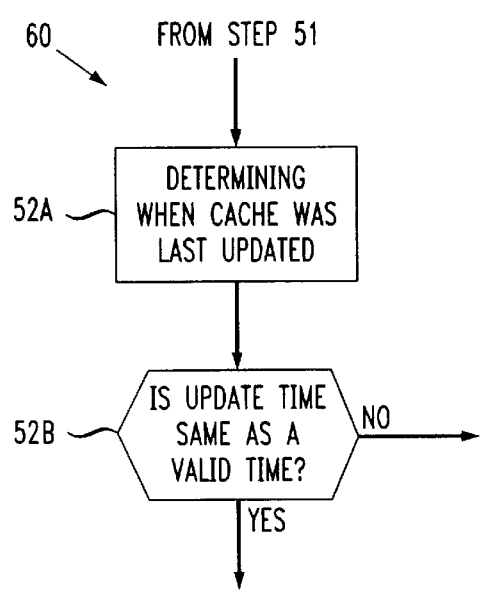
FIG. 6 shows a flow diagram of the details of a step of the validation process of FIG. 5.

FIG. 6 shows a flow diagram 60 of the details of step 52 of process 50 shown in FIG. 5. At step 52A, it is determined when the cache was last updated. Then, at step 52B, the last update time is compared with ValidPeriod or ValidMask for determining whether the cached copy is valid.

The present invention identifies itself to a server for authenticating the user. Consequently, shared library 16 and access server 17 are preferably configured inside system 10 as a separate entity. In this way, shared library 16 is aware of the identity of a user. Access server 17 obtains information from shared library 16 for informing servers connected to the Internet because access server 17 is not configured for determining the identity of the user making a system call request. Consequently, shared library 16 identifies itself to access server 17 before the access server can perform user authentication.

The present invention also supports both anonymous and authenticated accesses to Internet servers directly or via proxy servers. According to the invention, users can authenticate themselves to remote servers using a proper login name and password information for accessing files. An authenticated access includes a handshaking process in which shared library 16 first communicates with access server 17 that a request is to be authenticated. Access server 17 then communicates to shared library 16 that a file is to be created for obtaining a time stamp. Shared library 16 identifies the file to access server 17 once the file has been created. Access server 17 then accesses the file created by shared library 16 for confirming the information.

While the present invention has been described in connection with the illustrated embodiments, it will be appreciated and understood that modifications may be made without departing from the true spirit and scope of the invention.

What is claimed is:

1. A computing system comprising:
   a processor; and
   memory coupled to the processor, the memory including, an application, an operating system, a cache associated with the operating system, and a logical layer between the application and the operating system, the logical layer including an access server and a shared library which has an integrated personal name space, the integrated personal name space having a personal path name prefix, the shared library (a) intercepting a system call from the application to the operating system for a file, (b) determining whether a path name for the file is located under a personal name space in the memory based on a presence of the personal path name prefix in the path name, and (c) issuing a request for retrieving the file from an Internet resource when the path name is located under the personal name space and when the file is not stored in the cache, the access server, responsive to the request from the shared library, retrieving the file from the Internet resource and mounting the retrieved file in the cache under the personal path name prefix, and the shared library issuing the system call to the operating system when the access server retrieves the file from the Internet resource.

2. The computing system according to claim 1, wherein the access server includes a plurality of agents, each agent implementing a predetermined Internet access protocol, and wherein the access server selects an appropriate access protocol for retrieving the file from the Internet resource.

3. The computing system according to claim 2, wherein the shared library and the access server operate transparently in response to the system call.

4. The computing system according to claim 3, wherein the shared library receives the system call from an application running in the memory.

5. The computing system according to claim 4, wherein the access server restores the file to the Internet resource when the application closes the file.

6. The computing system according to claim 4, wherein the access server access the file from the Internet resource using a user's password information.

7. The computing system according to claim 6, wherein the shared library authenticates itself to the access server when the access server accesses the file from the Internet resource using the user's password information.

8. The computing system according to claim 2, wherein the access server retrieves the file from the Internet resource by directly contacting a remote server associated the Internet resource.

9. The computing system according to claim 2, wherein the access server retrieves the file from the Internet resource by contacting a remote server associated with the Internet resource through a proxy server.

10. A method for accessing resources connected to the Internet, the method comprising the steps of:

receiving a system call for a file at a shared library;

determining whether the file is cached locally;

determining whether a path name for the file is located under a personal name space based on a presence of the personal path name prefix in the path name, the personal name space being integrated into the shared library;

retrieving the file from an Internet resource based on the path name located under the personal name space when the file is not stored in the cache and has a path name located under the personal name space;

issuing the system call to an operating system of a computing system when the file is retrieved from the Internet resource;

and mounting the retrieved file in the cache under the personal path name prefix.

11. The method according to claim 10, further comprising the step of restoring the file to the Internet resource when the file is closed.

12. The method according to claim 11, wherein the step of retrieving the file from the Internet resource includes the step of accessing the file from the Internet resource using a user's password information.

13. The method according to claim 10, further comprising the step of determining whether the file is valid when the file is cached locally based on a last time that the file was cached and a valid file cache time.

* * * * *

UNITED STATES PATENT AND TRADEMARK OFFICE
CERTIFICATE OF CORRECTION

PATENT NO. : 6,078,929
DATED : June 20, 2000
INVENTOR(S) : Chung-Hwa Hermann Rao It is certified that error appears in the above-identified patent and that said Letters Patent is hereby corrected as shown below:

On the title page: please insert as follows:

--Related U.S. Application Data

[60] Provisional application No. 60/019,303 June 7, 1996.--

Signed and Sealed this

Twenty-fourth Day of April, 2001

Attest:

NICHOLAS P. GODICI

Attesting Officer     Acting Director of the United States Patent and Trademark Office